United States Patent
Hofmann

(10) Patent No.: US 9,546,747 B2
(45) Date of Patent: Jan. 17, 2017

(54) APPARATUS AND METHODS FOR FLUID PROCESSING AND FLOW CONTROL

(75) Inventor: Martin John Hofmann, Stroud (GB)

(73) Assignee: BIOTECHFLOW LTD. (GB)

( * ) Notice: Subject to any disclaimer, the term of this patent is extended or adjusted under 35 U.S.C. 154(b) by 98 days.

(21) Appl. No.: 14/112,261

(22) PCT Filed: Apr. 18, 2012

(86) PCT No.: PCT/GB2012/000378
§ 371 (c)(1),
(2), (4) Date: Apr. 24, 2014

(87) PCT Pub. No.: WO2012/143693
PCT Pub. Date: Oct. 26, 2012

(65) Prior Publication Data
US 2014/0224335 A1    Aug. 14, 2014

(30) Foreign Application Priority Data

Apr. 18, 2011 (GB) .................................... 1106556.2
Jun. 28, 2011 (GB) .................................... 1111119.2
Sep. 2, 2011 (GB) .................................... 1115458.0

(51) Int. Cl.
*F16K 7/04* (2006.01)
*F16L 11/10* (2006.01)
(Continued)

(52) U.S. Cl.
CPC ............ *F16L 11/10* (2013.01); *B01J 19/0093* (2013.01); *B01L 3/502738* (2013.01);
(Continued)

(58) Field of Classification Search
CPC .................................. F16K 7/04; F16L 41/03
(Continued)

(56) References Cited

U.S. PATENT DOCUMENTS 2,575,240 A * 11/1951 Thompson ................ F16K 7/07
137/625.11
3,360,008 A * 12/1967 Childers ............. B29C 33/0033
137/561 R
(Continued)

FOREIGN PATENT DOCUMENTS

EP          0107631 A2    5/1984
EP          1738820 A1    1/2007
(Continued)

*Primary Examiner* — John Fox
(74) *Attorney, Agent, or Firm* — Dureska & Moore LLC; David P. Dureska; David J. Danko

(57) ABSTRACT

Fluid processing apparatus has a prefabricated branched network of flexible tubing, for conducting process fluid between process elements of the apparatus, and control valves. A tubing support has opposable front and rear plates which define a pattern of support channels between them in which the flexible tubing network lies, so that the support channels limit or prevent expansion of the flexible tubes. Standard non-reinforced tubing can then be used for high-pressure work. The support body plates can be separated to open the channels for insertion or removal of the flexible tubing. The front plate may be transparent. The control valves operate by simply pressing on the tubing in the support channels to block flow, without invasion of the flow path. The tubing sets can be easily replaced, cleaned or sterilized. The invention is useful in a range of controlled-flow processes e.g. chromatography and filtration.

22 Claims, 11 Drawing Sheets

(51) Int. Cl.
 *B01J 19/00* (2006.01)
 *B01L 3/00* (2006.01)
 *F16K 7/07* (2006.01)

(52) U.S. Cl.
 CPC ............... *F16K 7/045* (2013.01); *F16K 7/07* (2013.01); *B01J 2219/00783* (2013.01); *B01J 2219/00792* (2013.01); *B01J 2219/00817* (2013.01); *B01J 2219/00896* (2013.01); *B01L 2200/12* (2013.01); *B01L 2300/0681* (2013.01); *B01L 2300/0832* (2013.01); *B01L 2300/0864* (2013.01); *B01L 2300/0867* (2013.01); *B01L 2300/123* (2013.01); *B01L 2400/0487* (2013.01); *B01L 2400/0655* (2013.01); *Y10T 137/0318* (2015.04); *Y10T 137/877* (2015.04)

(58) Field of Classification Search
 USPC ...................................................... 137/561 A
 See application file for complete search history.

(56) References Cited

U.S. PATENT DOCUMENTS

| | | | | |
|---|---|---|---|---|
| 3,683,960 A | * | 8/1972 | Kirsch | ............... B29C 33/0033 137/594 |
| 3,823,724 A | * | 7/1974 | Davis | ........................ F16K 7/00 137/15.01 |
| 4,913,183 A | * | 4/1990 | Vogel | ..................... B29C 65/08 137/15.08 |
| 5,282,488 A | * | 2/1994 | Roth | ........................ B67D 7/78 137/15.08 |
| 6,432,345 B1 | * | 8/2002 | Warburton-Pitt | . B29C 45/14614 264/263 |
| 7,829,018 B2 | * | 11/2010 | Olsen | ..................... A61M 1/101 210/645 |
| 2012/0031510 A1 | | 2/2012 | Weissenbach et al. | |
| 2012/0138173 A1 | | 6/2012 | Cirou et al. | |
| 2012/0138522 A1 | | 6/2012 | Cirou et al. | |

FOREIGN PATENT DOCUMENTS

| | | |
|---|---|---|
| EP | 1832861 A1 | 9/2007 |
| EP | 2184103 A1 | 5/2010 |
| WO | 2010084432 A1 | 7/2010 |
| WO | 2011086488 A1 | 7/2011 |
| WO | 201154883 A1 | 12/2011 |

* cited by examiner

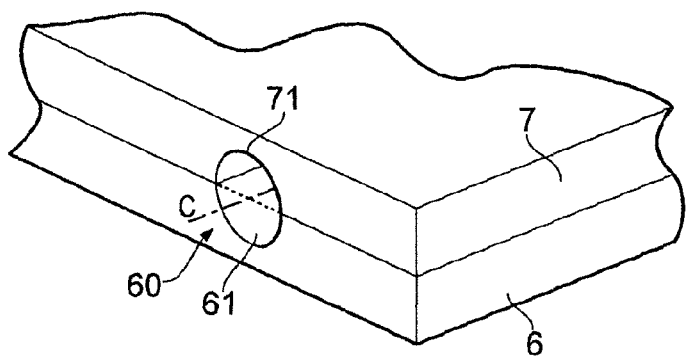
FIG. 17
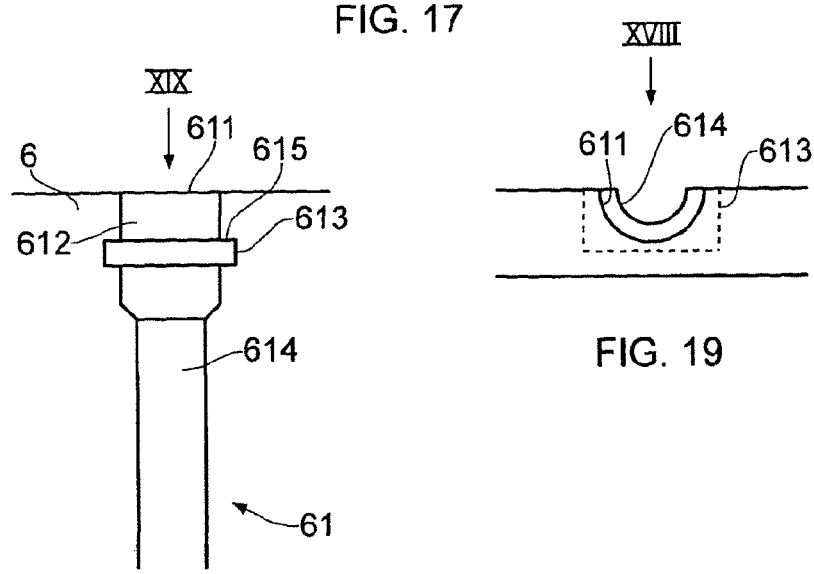
FIG. 18
FIG. 19
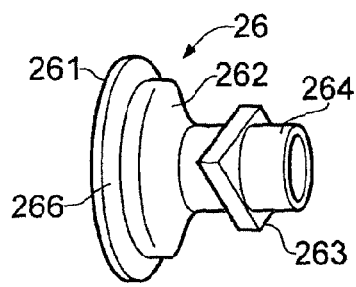
FIG. 20

APPARATUS AND METHODS FOR FLUID PROCESSING AND FLOW CONTROL

CROSS-REFERENCE TO RELATED APPLICATIONS

This application claims the benefit of PCT Application Ser. No. PCT/GB2012/000378 filed Apr. 18, 2012, and Great Britain Patent Application Ser. Nos. 1106556.2 filed Apr. 18, 2011, 1111119.2 filed Jun. 28, 2011, and 1115458.0 filed Sep. 2, 2011.

FIELD OF THE INVENTION

This invention has to do with apparatus and methods providing and using prefabricated networks, flow path patterns or flow circuits of tubular conduits, operating with one or more valves or other flow control elements, and which may be applied in any of industrial, production, process, scale-up or research processes. My proposals have particular application to processes requiring pressurised liquid flow, i.e. in which the pressure in the flow conduits is above atmospheric in at least part of the flow network.

I particularly contemplate use with liquid processes such as purification, capture, absorption, adsorption, desorption, partition, separation, filtration, ultrafiltration, chromatography and the like. However the concepts disclosed may also be applicable with other kinds of process, or with gaseous fluids.

BACKGROUND

In the medical, nutrition, nuclear, environmental, biotechnology, pharmaceutical and fine chemicals industries there are various processes which require pressurised supply of process liquids via a network of tubular conduits. The network or circuit has flow control whereby e.g. the flow can be selectively switched off or on in a given conduit, directed to or from one of various selectable branch or manifold conduits, directed selectively through a process device such as a chromatography column, filter or ultrafilter, perhaps in either direction, or through a bypass conduit instead.

These industries usually observe strict standards of purity, non-contamination or sterility as well as product quality control. The flow is subject to the action of any necessary valves, gauges, sensors and the like without exposure to the exterior, and without exposure to apparatus materials that might contaminate it or it contaminate them. The apparatus and its elements may need to be formally certified in this respect. The process may need to be run for a period of days, or months or even years without the flow network being disassembled.

Pressurised flow (low, medium or high pressure), driven by a pump or head of liquid or other pressure source of the apparatus, is needed where a process device (such as a chromatography column or filter) presents a large resistance to an operational flow through it i.e. a back-pressure. A pump is needed to achieve satisfactory flow rate. Small-diameter tubing in itself presents a substantial resistance to flow.

Pressure in the upstream region may be substantially above atmospheric, e.g. above 1 bar (gauge), perhaps above 2 bar and not infrequently above 5 or 10 bar. (1 bar=100 kPa] The tubing, connected devices and the connections between them must all be able to withstand this, as well as being susceptible to cleaning by flow of sterilising liquids and the like. To this end the tubing network and especially its connections should be as free as possible of sharp angles or other features causing "unswept" regions.

Conventional industrial high pressure processes use stainless steel tubing. The network of conduits, flow control devices, sensors, gauges, etc. is designed and the corresponding piping and other components are pre-assembled, usually being mounted on a wall or in a trolley, cabinet or mobile "skid" to integrate the apparatus and maintain the alignment of the—mainly rigid—components to prevent movements or distortions causing leaks or damage.

This assembly may comprise all the devices necessary for the process, or there may be reasons for keeping one or more of these separate e.g. a chromatography column which may need to stand separately because it is large, or needs all-around access. These pre-fabricated and custom-designed assemblies are expensive and require substantial maintenance care, but this is justified by the high value and sensitivity or toxicity of products being processed.

For short-term or small-scale work, research or laboratory set-ups and in some production processes a common practice is to use a network of flexible polymeric tubing, especially silicone tubing which is readily available in many sizes. Advantages of silicone tubing are that it is available in polymer grades with low extractables, can be sterilised, is obtainable inconveniently transparent or translucent forms and is highly flexible and chemically inert. Polymeric e.g. silicone tubing is also available in pre-fabricated branched or "manifold" formats which facilitate network assembly. In such work, valving is easily provided using manual clamps, such as surgical clamps. However there is no question of using ordinary silicone tubing for higher pressure processes, above about 0.5 bar/50 kPa (gauge). Polymer tubing with braided reinforcements is available and can withstand high pressures, but to the extent that it is able to withstand more pressure it tends to be less convenient for assembly into networks with non-invasive flow control.

Objects of Our Proposals

Our aim here is to propose new and useful fluid flow control systems and methods of operating them, particularly but not exclusively in pressurised flow applications such as those described above, and advancing the art so as to avoid or reduce variously at least some of the mentioned disadvantages and limitations.

The Invention: Our Proposals

Our proposals are made in the context of fluid processing apparatus which has a flow network of tubular flow conduits of flexible tube material for conducting process fluid between the process elements of the apparatus, and which comprises one or more flow control mechanisms such as valves for controllably modifying the flow of fluid in the network.

What we propose is to provide a tubing support body defining a pattern of support channels in which all or part of the flexible tubing network is received, the flexible tubes thereof lying in respective support channels generally co-extensively so that the support channel limits or prevents expansion of the flexible tube material. This can prevent bursting of the tube even when it is subject to internal pressures substantially higher that its usual rated pressure, typically meaning pressures above 0.5 bar/SOkPa (gauge).

The flow network usually includes one or more junctions or branching points, i.e. where three or more tube parts meet. To facilitate assembly of the flexible tubing in the support body, the support body preferably defines its channels between opposed support body parts which can be separated to open the channels for insertion or removal of flexible tubing, and close together to enclose flexible tubing closely in the channels. The closed channels are of course usually cylindrical, although exact cylindricality is not necessarily needed to prevent bursting. Preferably the cavity to form the channel is defined partly in the face of one opposable part of the support body and partly in the opposed face of the other, e.g. as generally semi-cylindrical grooves in each. Or, one body part may define most or all of a channel to receive the flexible tube, and the other part simply provides a cover for it (which may or may not be shaped to complement the tube).

One preferred refinement has a slight overhang of one or both part-channel edges on one body part, e.g. by the part-channel being formed as slightly more than half a circle so that the edges overhang the interior, or by having one or more protrusions extended along or distributed along one or both edges, to help retain flexible tubing provisionally until the assembly is closed.

The support body should be of generally rigid material. Plastics material is preferable but it could be metal e.g. steel. The materials of two said opposable parts need not be the same. Channels or part-channels may be formed by machining or moulding. Desirably a single support body defines all of the support channels for the desired flow tube network, so that the corresponding flexible "tubing set" can be supported in a fixed disposition, e.g. in a plane, curved layer, or cylindrical or wrap-around format. Any of these is consistent with the format providing the support body as opposable front and rear (or inner and outer) parts as discussed above.

Desirably at least a front (or outer) portion of the support body is transparent or translucent, so that the disposition of tubes and desirably the presence or absence of liquid in them can be seen directly. A particular form envisaged is a combination of front and rear plates with corresponding patterns of grooves on their opposable faces to form the channel pattern, the front plate being transparent. It may be for example of a suitable acrylic polymer. It does not contact the process fluid so the choice is wide.

The support body may be provided on a fixed or mobile stand such as a skid, trolley or cabinet, or it may be mounted on a wall or ceiling.

Where the support body comprises separate or opposable parts as described, it may comprise or be mounted in or on mechanism or structures for controlling the movement of the opposable parts relative to one another. In particular it may incorporate guide mechanisms, such as one or more ramps, pins, slides or the like, engageable between the body parts, to ensure that they come together in correct alignment. It may also include a drive mechanism operable to drive the parts apart or together again.

The support may be moveably mounted so that its orientation can be changed on its mounting, e.g. between substantially horizontal (for removing or inserting tubing) and upright (for visibility in use).

The support body will have plural emergence points where the flexible tubing emerges from the support of the support body. Preferably these are at edge or end portions of the support body. Where it has opposable parts it is convenient that the emergence points are at the meeting point between the opposable parts (to avoid threading tubing through holes in the parts, which would be an alternative). Tubing portions not subject to excessive pressure may simply extend out beyond the support body.

However in pressurised applications at least some elements of the flow pattern will be subject to high pressure in use and for these desirably the flexible tubing terminates at or before the emergence point so as not to be liable to bursting. Further options for tubing unions or terminations at the emergence point(s) are discussed below. The flexible tubing at an emergence point may connect directly to a flow device or to further tubing with a higher pressure rating, e.g. reinforced tubing or steel tubing. The support body may define an emergence connection formation, e.g. in the form of an enlarged or flared recess part relative to the main channel diameter, to receive a connector part or joint reinforcement at the joint where the supported flexible tubing is connected to the external element. Further options are described below.

Flow Control: Valves

The flow network control additionally comprises one or plural flow control mechanisms, and specifically one or more valve devices. In conventional high-pressure systems these are specialised modular devices—usually diaphragm valves—which are connected in-line into the steel (or other high pressure-rated) piping by clamp fittings or the like. What we propose is that, in our assembly with the flexible tubing supported or sandwiched in the support body, valve devices may be operable so as simply to press on tubing in its channel, compressing the tube to block the flow.

Such a valve will generally comprise a presser element housed or mounted in the support body at the desired valve position, and movable relative to the support body across the support channel so that it will compress a flexible tube therein. Desirably the presser element of the valve is formed as or with a rib or bar extending transversely over the channel, so as to nip the tubing effectively. Optionally a side of the channel opposing the presser is formed with a local relative eminence—analogous to the "weir" in a diaphragm valve—to make a more positive seal. Of course there may be a more complex presser mechanism, e.g. with a pair of opposed presser elements which are both movable, or a convergent or tapering element which moves slidingly across the tube to press by a wedge action. Alternatively a clip over clasp, detachable for assembly, is used and this is pulled, thereby closing the tube.

The valve device also comprises an operating mechanism for driving the presser element relative to the channel to close the tube, to hold it there to keep the valve closed, and to release it controllably to open the valve again.

This operating or driving mechanism can simply be mounted onto the support body, e.g. screwed, bolted, pinned, bonded, moulded in or otherwise secured in or onto it, e.g. at an external face e.g. of one of two opposable support body parts as mentioned above.

A variety of suitable mechanisms for driving valve movement is already well known to the skilled person and includes electrical, electromechanical e.g. via cam, pneumatic, electromagnetic (e.g. servo-motor) and manual (e.g. push-button) mechanisms. They may be automatically controlled, in a manner known per se. Where the support body is formed with an obverse and reverse as discussed above, it may be preferred to mount the valve devices on the reverse so that they do not obstruct the view (except of course for valves which are directly manually-actuated). The material of the part of the support body mounting the valve devices should be selected for secure mountings of the relevant type, e.g. engineering plastics such as acetal.

The above proposals include the provision of one or more flow control mechanisms, specifically valve devices, comprising mechanisms with elements for pressing on the tubing in its channel, compressing the tube to block the flow. The following proposals develop those proposals.

In general, a valve device for use in the present context includes a presser element housed or mounted in the support body at the valve position, and movable relative to the support body across the support channel to a "closed"

position in which it will compress a flexible tube in the channel to shut off flow. An actuator is provided to drive or control movement between the closed and open positions of the presser element. Some preferred forms of the presser element, and the possibility of providing a counter-projection on the opposite surface to improve the seal (or reduce the force required to achieve a seal) are described above.

A first general preference herein is that the presser element and actuator are disposed, relative to the support channel and support body at the valve location, so that movement from the open position to the closed position is by pulling the presser element towards an actuator module of the actuator through a tensile connector. The actuator module may be mounted against an outer face of one of the opposable support parts overlying the valve site on the support channel.

This can provide two significant advantages. Firstly, the force of the presser element does not tend to push the opposable support parts (e.g. support plates) apart. This is important, because integrity of the interface between the opposed support parts is necessary to protect the flexible tubing. Also, if the counter-surface of the channel against which the presser element squeezes the tube lies beneath amounting of the actuator module on the outer surface of that support part, the reaction force tends to urge the actuator module into contact with the support part (rather than away from it, as would be the case if a "push" mode is used). This reduces the load on the actuator attachment to the support part, so that smaller parts can safely be used.

For implementing a valve using a pull to compress the tubing, typically an access opening is formed through the first one of the support parts/plates, e.g. to the side of the support channel which receives the flexible tubing in use, and a tensile actuating element or draw bar extends axially slidably through this side opening. The distal end of the tensile element or draw bar comprises or carries the presser element, which should extend transversely, and desirably perpendicularly, across the tubing path. A moving component of the valve may make a rotational alignment engagement with an adjacent fixed component to keep the presser element aligned transversely to the tubing path.

It is preferred that the centre of the drive axis of the actuator be coincident or substantially coincident with the support channel centre line corresponding to where force is applied to squeeze the flexible tubing.

The presser bar with its tensile connecting element may form an L-shaped member, reaching past the tubing. However the pull may be transmitted to the presser element through more than one tensile connector e.g. through a U-shape, annular or stirrup component.

A preferred feature in a valve of this kind is that the presser element is movable away from its operating position, traversing the tubing path, to facilitate movement of tubing into or out of the tubing path, which typically a channel in the corresponding support part. It may be for example detachable from its actuator or tensile connector, or pivotable (e.g. around its actuator or tensile connector as a pivot) so that it can be swung away from the tubing path. The actuator or tensile connector may have a release mechanism or release coupling which is selectively operable to allow such pivoting, while normally preventing or limiting it.

Whether the presser element is operated by pull or push action, the element/actuator may be urged by a restoring spring to a closed position. Or, there may be a double-acting actuator with the drive (pneumatic or electromagnetic) operable to drive it positively in either direction without a residual restoring force. Indeed, depending on the needs of the system, there might be value in having a return spring urging it to the open position instead of the closed position. The actuator or valve device may therefore include a return spring operable so that, when the actuator is not energised (e.g. pneumatically or electromagnetically), the return spring holds the presser element in the closed position i.e. to shut off the flexible tubing in use. This can give a fail-safe mode of the system whereby in the case that actuating power of the valves is lost, flow is stopped and leakage prevented.

Depending on materials, the flexible tube will usually have its own elastic tendency to open up again when the presser element is released. If there is raised pressure in the tubing this will open the tube when the valve is released.

Any valve device as described above in general terms may be implemented in any of the general apparatus and methods described herein.

Tubing

Flexible tubing used with the system is desirably silicone tubing, such as addition-cured silicone which is low in extractables. Skilled people are familiar with a range of suitable tubing materials for different uses, taking into account the operational demands such as chemical resistance, temperature resistance, permeability constraints etc. Usually the tubing is polymeric, usually resilient or elastomeric. It may be e.g. thermoset polymer or thermoplastic elastomer. Usually the tubing outer diameter is from 5 mm to 30 mm but this is not critical to the concept.

Prefabricated polymer tubing junctions or manifolds are well-known to the skilled person. They usually encase or encapsulate the intercepting tube portions with a resiliently deformable polymeric encapsulation. A valve presser may be positioned to act on the tubing at one of these junction points, compressing the encapsulation.

General Layout

The area of the support body providing the channel path network layout may be e.g. from 0.25 $m^2$ to 5 $m^2$:

The network pattern, i.e. the actual topological pattern of flow pathways and valve positions, will be designed in line with the process to be performed. It may be standard. It may be machined into a support body "blank" e.g. on a custom design basis. Particular elements typical of such networks are manifold or branch portions, e.g. for the selective input of liquids such as reagents or buffers from a selected one or several supplies, each with a control valve, or for the output of liquid selectively into a selected one of various collectors, e.g. fraction collectors, each with its own outlet conduit having a respective control valve. For a chromatography or filter process or the like, there may be a set of valves (in a known "bridge" arrangement) whereby flow from the pump may be sent through the column or filter, perhaps in either one direction or the other, or else bypass the column or filter. One or more exteriorly-connected valved connections (optionally with bypass paths) may be provided for ancillary components such as clarification filters (e.g. for the input to a chromatography column), bubble traps, pressure gauges and the like. The latter may optionally be integrated into or mounted on the support body itself.

The skilled person will understand that, the valve-controlled network of flow pathways being provided, the valves can be controlled, e.g. automatically, by any suitable means, e.g. in line with conventional practice. Typically this will involve a programmed or programmable microprocessor incorporated into or accompanying the flow control module. The tubing support body enables a conveniently valve-controlled high-pressure tubing assembly to be made up conveniently from ordinary flexible tubing that does not itself need a high pressure rating. It can be valved entirely non-invasively, i.e. so that the fluid "sees", is in contact with only a single material. Apparatus approval, cleaning and certification can be simple, therefore.

Simple compression valves can be used, and there is no need to spend a lot of time and trouble connecting in-line valve modules into the system. It is necessary only to fit a prefabricated tubing set with the required topology into the support body and close the channels. The tubing set can be provided in sterilised form, e.g. sterilised by gamma radiation as is well known.

There may be no unswept areas in the pre-fabricated flow network, because it is all made from the same tubing, which is available with constant cross-section at joints.

Support Channel Form

Firstly, I confirm that it is preferable to form the support channel of a support body, in which the tubing is received, with a circular or substantially circular cross-section subtending more than 180°, with the width of the opening being less than the free (unpressurised) external diameter of the tubing. This locates the tubing conveniently as it is installed. Preferably the exterior of the tubing fits closely or snugly in the channel, but without compression or interference (at least, after it has been pushed in through the opening). Preferably the channel subtends from 190°, e.g. about 200°. Usually it subtends less than 250°, preferably less than 220°. Angles are relative to the central axis of the cross-sectional shape, taken as a circle. Preferably cross-section is uniform along the channel.

Desirably an opposing channel on the other, opposing support body complements, with the same radius, to complete the circular cross-section. An undercut channel with the mouth overhang can be cut with a suitable machine tool e.g. having a ball shape, moving in the longitudinal direction of the channel.

Protection of Exterior Terminations

As mentioned, external connections can be made to process components at the emergence points, with suitable local tube support or reinforcement components being provided if necessary to avoid over-pressurizing the end of the flexible tubing, or there may be a cover of stronger material surrounding the tubing termination which clamps into the support, e.g. in the form of a circumferential lug which mates to recesses in the support thereby entrapping the termination to avoid the tubing extruding outside the pressure envelope.

The following proposals relate to structures and measures enabling connection of tubing ends, emerging from the support of the support body to connect to external tube elements of the flow system, e.g. to further flexible tubes, or to connector unions of functional system components.

A particular issue with tubing lines subject to high pressure is to extend the mechanical support for the flexible tubing (the "pressure envelope") sufficiently far to reach the joint thereof with the external component. A tubular termination cover, e.g. in a cup, sleeve or ferrule form, is contemplated.

It may be made from any suitable material with adequate tensile hoop strength, e.g. from a suitable plastics material. [Such components are available in engineering plastics materials such as PES, but PES although strong lacks toughness, and a filled standard polymer such as PP may be as good or better, as well as cheaper.]

Desirably the termination cover makes a mechanical engagement with the support body which restrains it from outward movement relative to the support body so that the tubing contained in it does not become exposed beyond the emergence point. As mentioned there may be a circumferential lug of the tubing cover, engageable in recesses of the opposed support plates of the support body to trap it in position.

One further proposal here is that the termination cover makes a mechanical engagement with the support body (e.g. with one or both of opposed support plates) to limit or prevent its rotation relative thereto, about the tubing axis. It is highly desirable to prevent twisting and turning of tube components and their joints and unions in a fluid flow system. Twists and turns tend to cause loosening and/or leakage of connections, either at the place concerned or elsewhere in the system. They may also cause distortion or damage to flexible tubing.

It will be understood that almost any shapes (other than coaxial circles) can be used for the mutually engaging parts of the tube termination cover component and the tubing support body to limit or prevent their relative rotation. Relevant practical constraints on the shapes include economy of material, ease of moulding, ease of machining (e.g. of any necessary complementary formation in the support body or plates thereof), simplicity of shape, easy identification of and movement to the correctly aligned position, and perhaps plural (degenerate) aligned positions e.g. to reduce the amount of turning needed on assembly. Thus, while for example the entire termination cover (sleeve, cup, shell, ferrule) might have an exterior non-circular surface, this might be uneconomical of material, and axially and/or circumferentially localised projection(s) or formation(s) might be more effective.

At the same time, and as mentioned previously, it is desirable that the termination cover has some formation engaging with the support body to prevent it from being pushed out from the support body (i.e. in the length direction of the tubing).

It is convenient to provide one or more formations on the tubing termination support, e.g. one or more lugs, flanges or other local projections, to serve both purposes, and to shape an interior formation of the support body accordingly, providing surfaces which engage the termination cover formation(s) to prevent it from turning in one or both directions, preferably both (i.e. a circumferentially-directed stop surface or stop surfaces) as well as to stop it from being pushed out from the support body (i.e. a longitudinally inwardly-directed stop surface).

Thus, the termination support may have a generally circular symmetry, e.g. a cup, sleeve or ferrule, with a rear portion which fits into an emergence-point recess of the support body e.g. between opposed plates thereof, and a front portion which projects outwardly from the support body e.g. to reach or make a connection with another tubing component, such as by means of a tri-clamp joint. The rear portion of the support may have one or more projecting lugs, e.g. a circumferential lug or flange, perhaps with an external polygonal shape, received in an interior slot of the support body (e.g. opposed slot portions cut into the opposing faces of two support plates). For example a retaining flange might be given a polygonal external form, such as a square or triangle, or a pair of diametrically-opposed tabs may project, or even a tab or flange on only one side.

In the case where the support body at the emergence point has two opposed support plates, and one is of a material with greater tensile strength than the other, it is desirable to form in these plates the clearances which receive the inner/rear part of the tube termination support member such that, when a retaining formation of the termination cover as mentioned above (for restricting rotational and/or outward movement) makes direct engagement with a limiting or counter-surface of the support plate made of the stronger material, clearance exists between the corresponding or other formation parts and corresponding counter-surface(s) of the other plate. In this way it can be arranged that normally the other plate takes less, little or no force from the retaining formations, although it may still be effective for general alignment of the components. This can be applied for example with the acetal and acrylic combination described in the previous example.

Joints

A preferred joint type for the tube ends is a tri-clamp joint. These are very well known. The ends of the two tubular components are provided with rigid ferrules of steel or plastics, having a rear tubular portion which connects around the tube, and a front flaring portion for clamping. The front flaring portion has a front sealing face which in use is pressed (abutted) against the corresponding face of the opposing ferrule, with a seal member between (usually a deformable sealing ring such as an O-ring, for which an annular seating groove may be provided on the front face). A discrete mechanical clamp, in the form of a segmented ring with an inwardly-directed convergent clamping groove, is then tightened around the edges of the two ferrule discs, squeezing them together to make and hold the sealed joint. Tri-clamp joints and seals can resist high pressures (for which reason they are not normally used with unreinforced silicone tubing, which cannot resist high pressures).

I prefer to use formations in which the tubing ends (i.e. the ends of the flexible tubing elements forming the supported network) are themselves outwardly flared. This may be integrally, or by moulding-on flexible polymeric terminations, desirably of the same polymer type/family as the tubing itself. A cup part or flared portion of the termination support body (of stiff plastics, for example) surrounds this enlarged tubing end portion, which may then present itself at the front of the flared portion for opposing to another ferrule on an external tubing component for joining e.g. with a conventional tri-clamp. If the enlarged flexible part is sufficiently flexible and resilient, it may be possible to dispense with a discrete sealing ring or gasket. A ring or gasket formation may be provided integrally on the tube end enlargement.

For example, a suitable mould may be used to shape the end of a curable tubular silicone preform into a suitable outwardly-flared formation, and then cured. It may be for example addition-cured silicone ("Pt-cured silicone") of a well-known kind. The shaped tube end is supported by a correspondingly-shaped reinforcing cup. If the tubing network has been pre-formed with a junction, so that only one end of the tube is free, it may be necessary to slide the reinforcing cup (termination support) onto the tube before moulding and curing the flexible end formation. The cup may have retaining formations of any kind as discussed above.

Assuring Correct Connections

With a flow system of the present kind, it is likely that plural emerging ends of the tubing network are connected to respective exterior flexible tubes. In many systems these flexible tubes are of similar or generally similar kinds, e.g. braid-reinforced polymer tubing, and it is difficult to tell them apart.

Moreover their other ends may be concealed within a skid or invisible behind other components. Since the joints themselves (e.g. tri-clamps) are also generally conventional and similar, there is a real possibility of connecting the wrong tubes to one another, leading at least to inconvenience and perhaps to disaster. In practice, careful and time-consuming checking is needed.

To address this issue, I propose that the tubes of the supported network, or at least their terminations, have respective mutually distinguishable colour coding or markings, and that the same be provided for respective tubes of the external systems, at least at their terminations which are to be connected at the present supported network. For example, different terminations may be coloured respectively red, blue, green, and the like, and each be connected to an external tube marked with the same colour.

Similar coding or marking may be applied at the other ends of the external tubes, for whatever components they are connected to. This is a generally applicable proposal, independently of and beyond use with the present special supported network. While the tubes themselves may be coloured or intimately labelled, it will normally be much more convenient and practical to use distinctive colours for termination supports and or joint ferrules, e.g. joint cups adjacent the end of the tubes. It is easy to manufacture such discrete, simple plastic components in a range of easy distinguishable colours. The complementary ferrules of the external tubing may be coloured similarly. The flexible tubing per se may then be standard, i.e. all the same colour, or non-coded.

A convenient alternative to bodily colouring of the termination covers (or other components, such as moulded tube junction encapsulations) is to use an in-mould method to apply or encase a label, marker or band. This may be coloured, or carry one or more symbols, text or other indicia. This is usually more economical and adaptable than producing differently-coloured materials for moulding or tube/tube junction formation. Or, adhesive methods may be used.

Modes of Application

As understood by a skilled person, liquid processing devices to be connected to or comprised in the flow control network module include any of those conventionally used in such a process.

Non-limiting examples include filters (which may be normal flow filters or cross-flow filters, or filters for ultra-filtration), bubble traps, mixing chambers, chromatography columns, other separation devices, heaters, coolers, irradiation devices and the like.

A pump will usually be connected to and optionally comprised in the flow control module, to drive the fluid process; it could be integrated into the module e.g. in a form of peristaltic pump.

Also, and again as familiar to the skilled person, control and monitoring devices (in addition to the valves already mentioned) can conveniently be connected to the flow network either remotely via tubing, or mounted directly on or integrated in, the support body. Such devices include any one or more of sensors, detectors, gauges and meters e.g. UV sensors or monitors, other radiation-based sensors, temperature sensors, pressure sensors, pH sensors, conductivity sensors, air sensors and the like.

Aspects of my invention include fluid processing apparatus comprising a supported flow network of the kind described. Methods of using such apparatus are also an aspect of the invention, and may optionally include the procedure of inserting and/or removing flexible tubing in relation to the support body e.g. with opening and closing of opposable portions of the support body. Fluid-processing methods using the flow network are an aspect of my proposals too. The support body in itself, with a channel pattern to receive the tubing and comprising the valve devices is a further aspect of our invention, as is a method of preparing such a support body by forming the channel pattern e.g. by moulding or machining.

A skilled person will appreciate how these proposals enable quick and easy assembly of a controlled flow network suitable for operating under raised pressure.

THE DRAWINGS

Having described the general concepts, we now illustrate these with reference to drawings of example construction elements and procedures, as follows.

Figure 3:
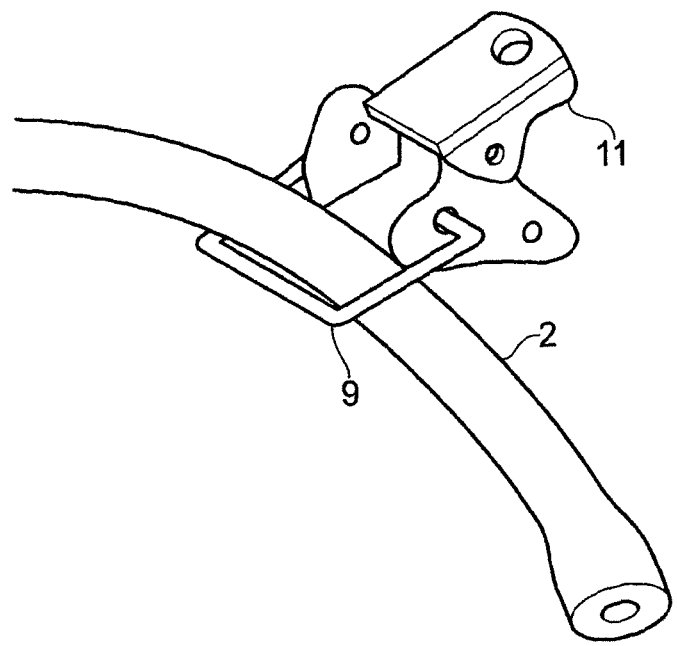
Figure 4:
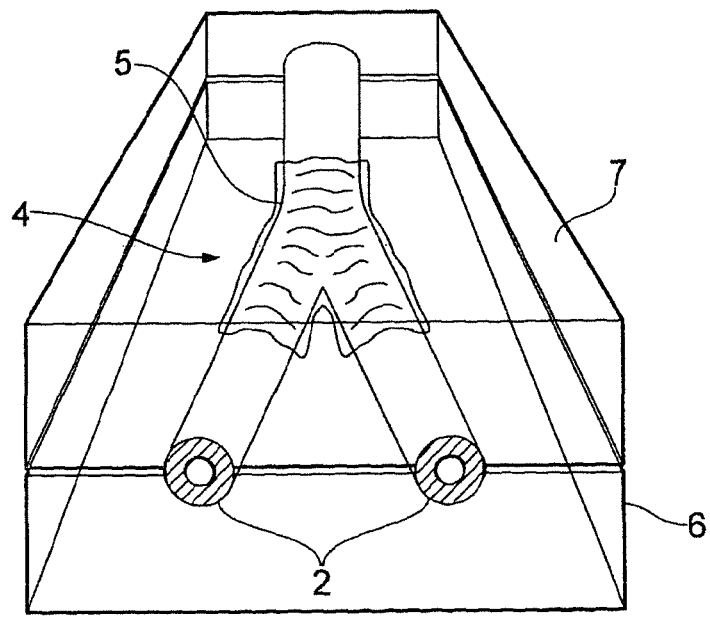
Figure 5:
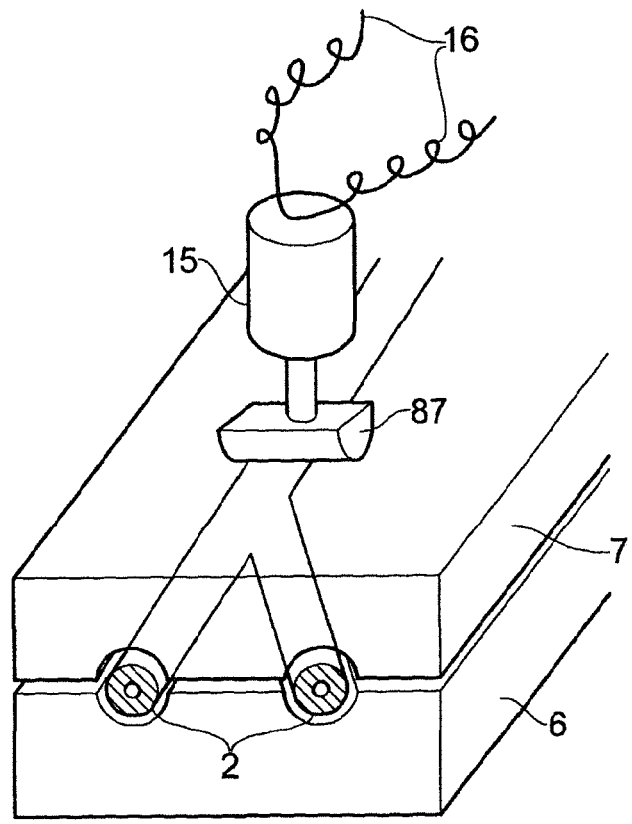
Figure 6:
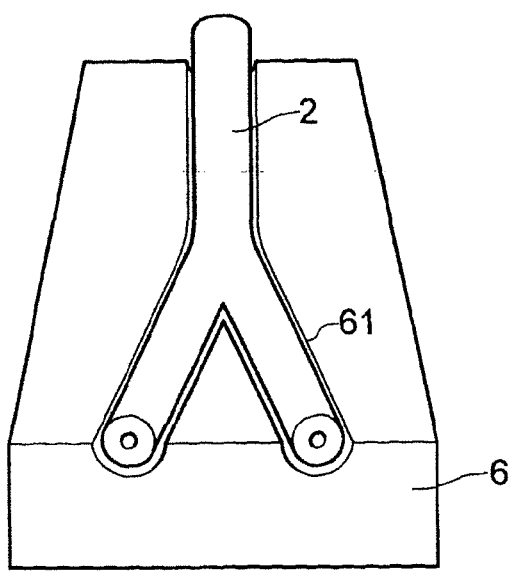
Figure 7:
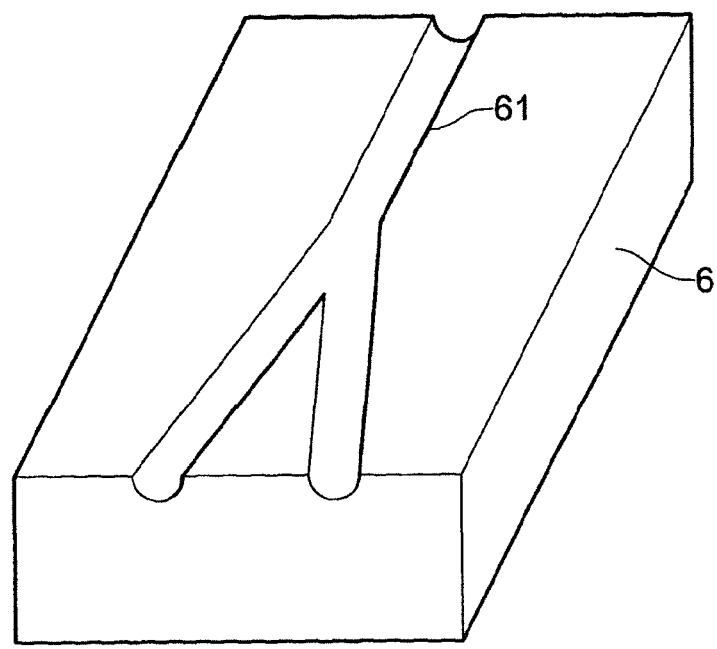
Figure 8:
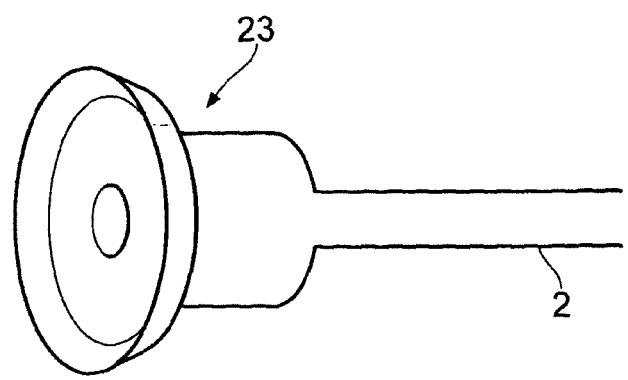
Figure 9:
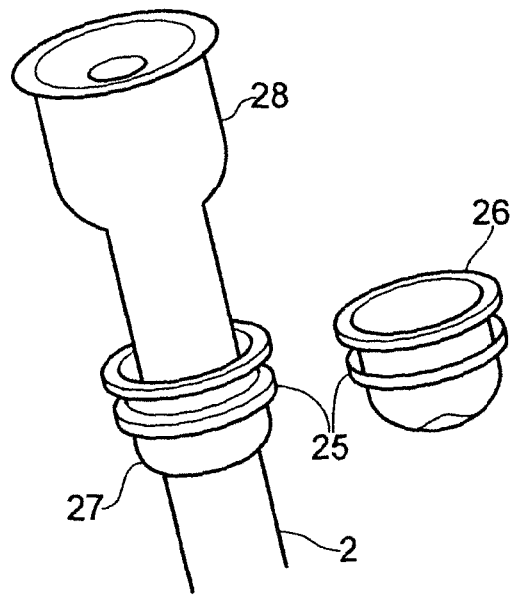
Figure 10:
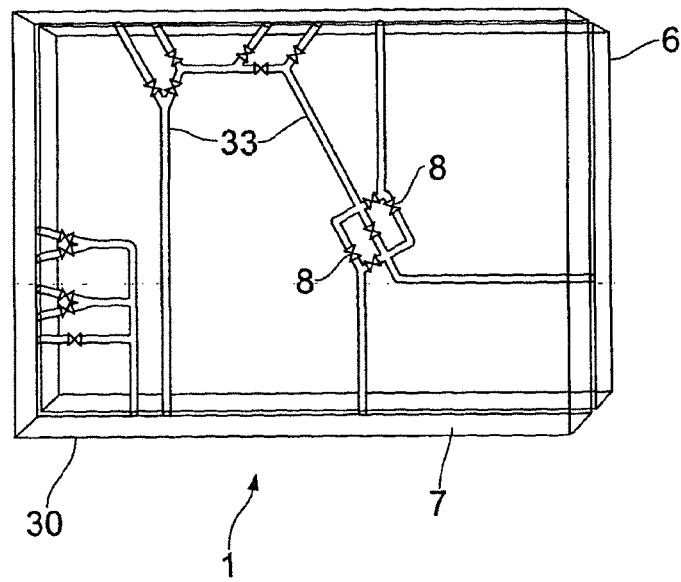
Figure 11:
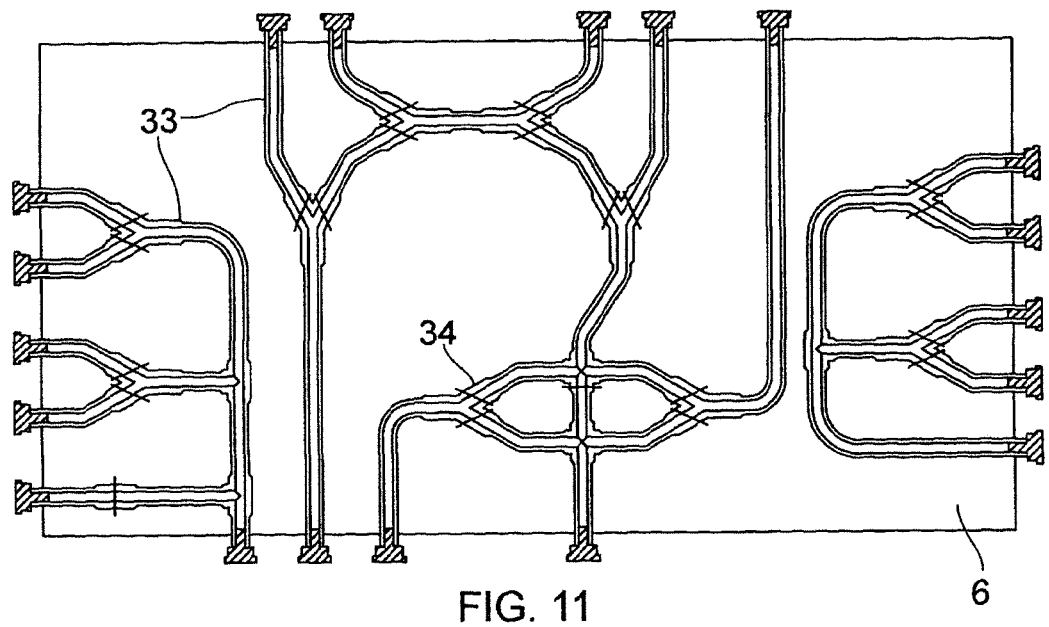
Figure 12:
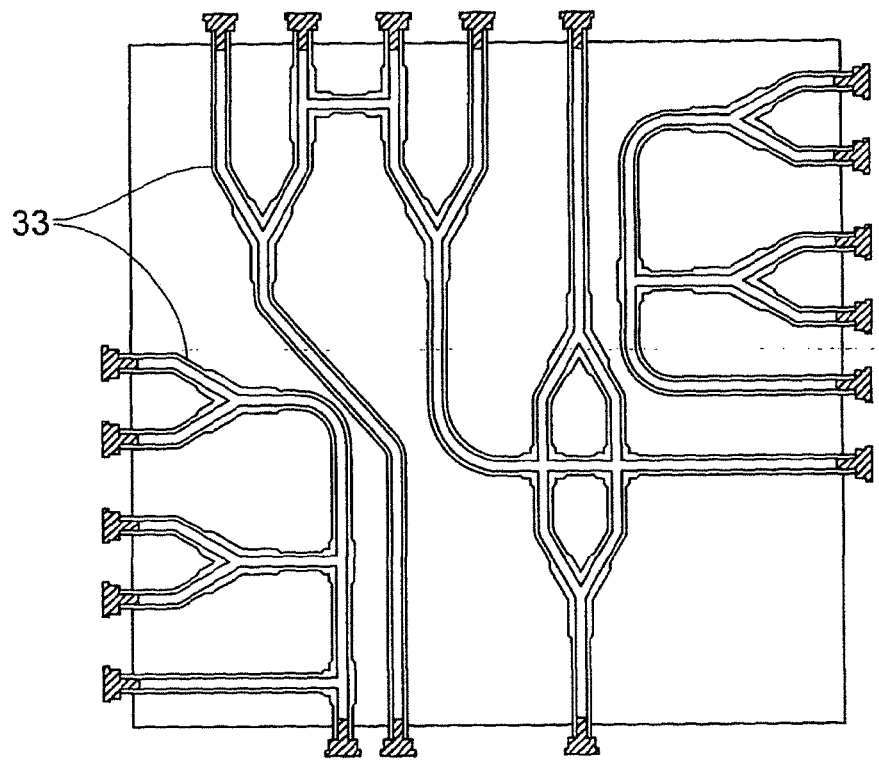
Figure 13:
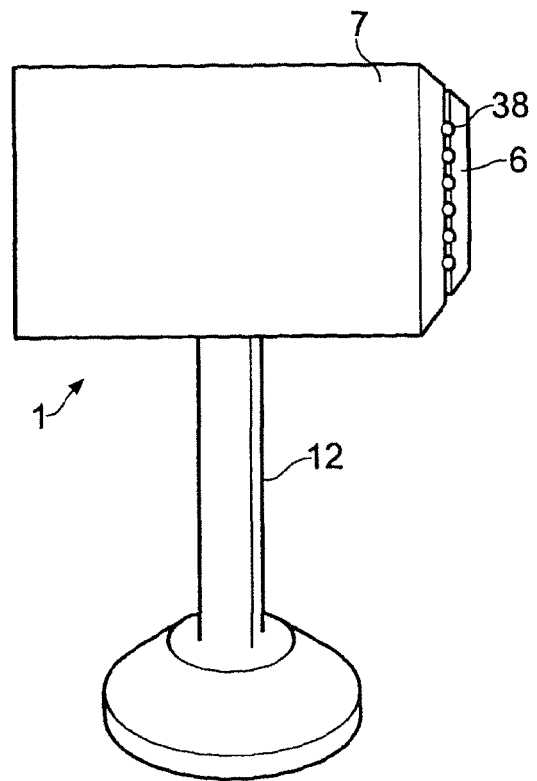
Figure 14:
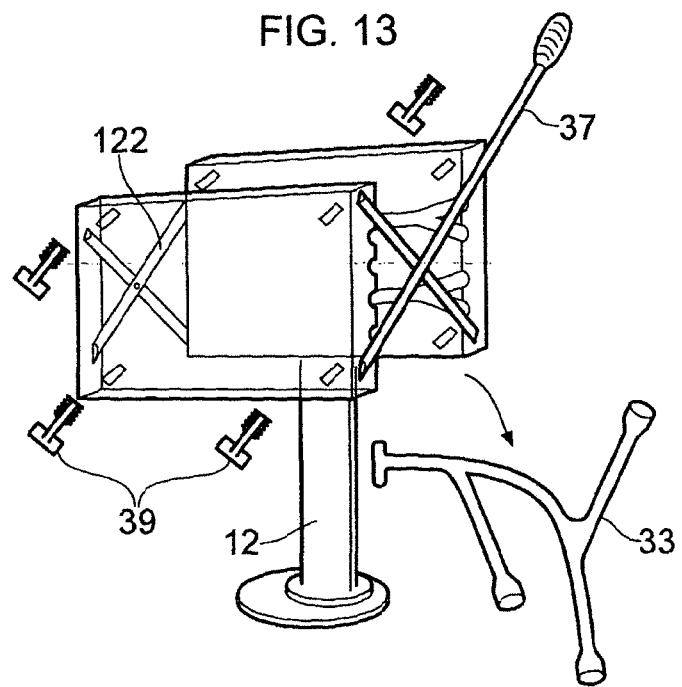
Figure 15:
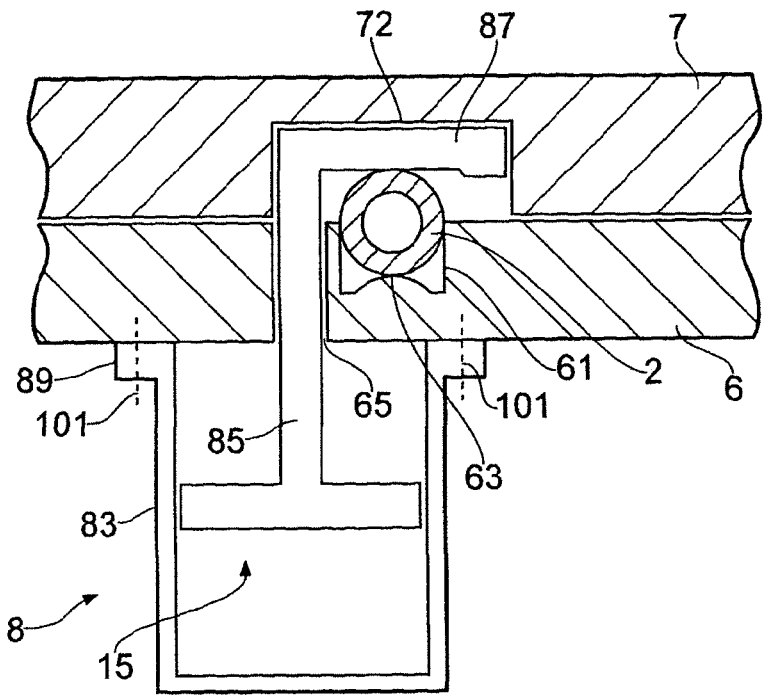
Figure 22:
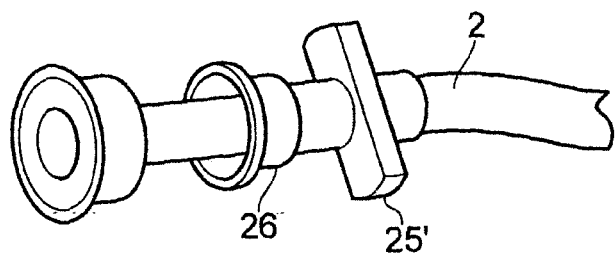
Figure 16:
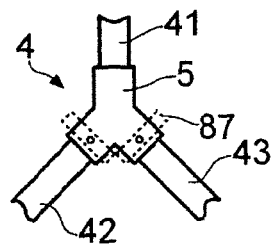
Figure 21:
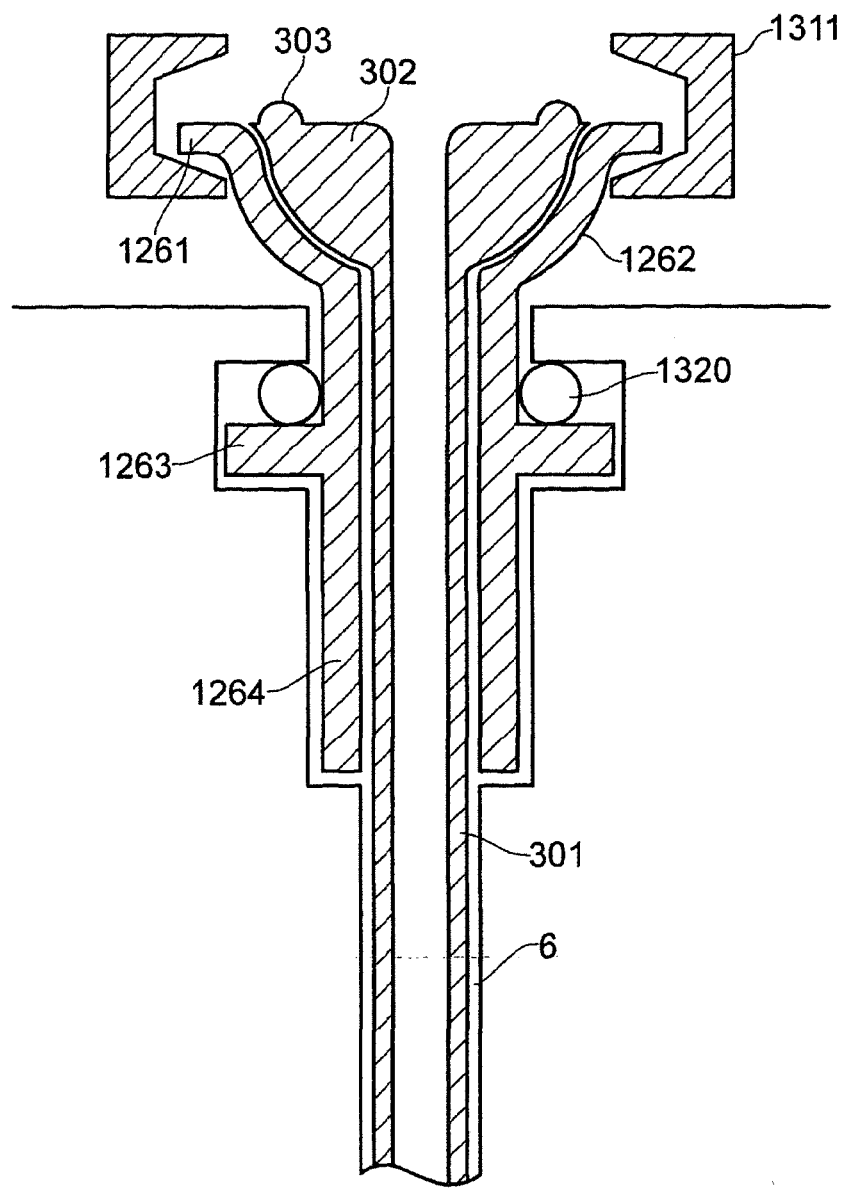
Figure 23:
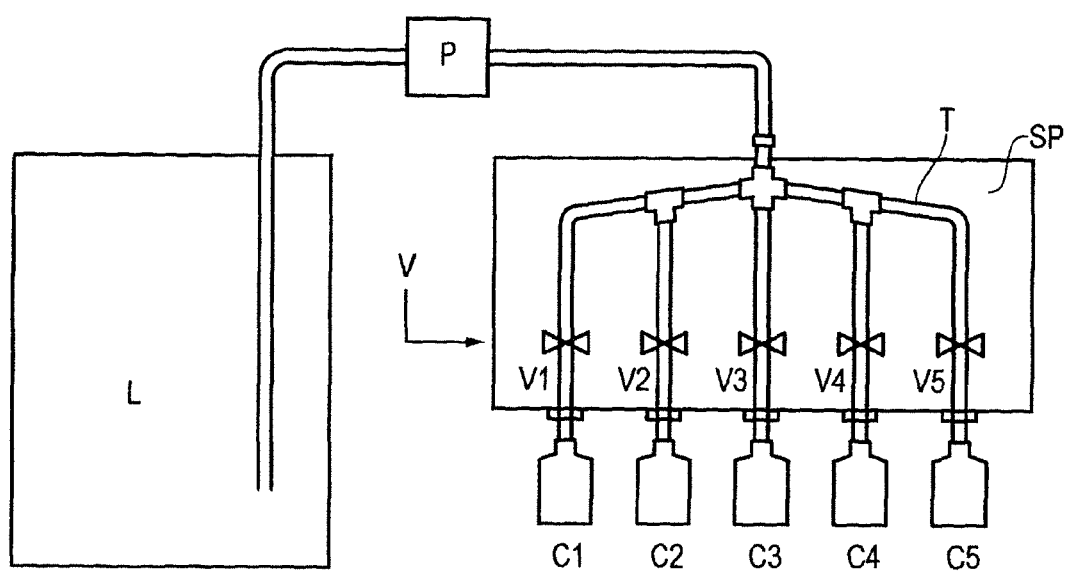

FIG. 3 suggests how a latch with a cam action might be used to pinch a tube shut;

FIG. 4 is a fragmentary cross-section showing a Y-junction of tubing encased in the support;

FIG. 5 shows schematically means for actuating means a valve presser;

FIG. 6 and FIG. 7 show a lower plate with and without a tubing Y-junction in position;

FIG. 8 shows a simple tubing emergence termination;

FIG. 9 shows a termination with a protective pressure-resistant cover;

FIG. 10 shows a support system and tubing embodying the invention, with a flow pathway suitable for a chromatography process;

FIG. 11 shows the corresponding tubing set, i.e. pre-formed branched tubing with terminations, showing also points for valving;

FIG. 12 shows a slightly different tubing set, again as laid out between the support plates, with indicators for apparatus elements to be connected to each termination;

FIG. 13 shows such a system mounted on a stand;

FIG. 14 shows schematically how such a stand may incorporate mechanism for controllably moving the support plates apart and together again;

FIG. 15 is a schematic cross-sectional view showing a valve device including an actuator;

FIG. 16 shows a tubing junction with a reinforcing encapsulation, showing valve pressure points;

FIG. 17 shows the edge of joined back and front plates of a support assembly at a tube emergence point, with details of channel shape;

FIGS. 18 and 19 are an inner face view and an edge-on view of the back plate of FIG. 17;

FIG. 20 shows a termination cover for the FIGS. 17 to 19 plates;

FIG. 21 shows another termination cover in situ;

FIG. 22 shows another termination cover;

FIG. 23 shows schematically a flow layout for distributing liquid from a bulk container to individual containers.

DETAILED DESCRIPTION

FIG. 10 shows a complete chromatography system example with a support body 1 made from a transparent front pressure holding plate 7 preferably made from transparent acrylic and a rear opaque stronger material pressure-holding plate 6 preferably made from acetal both with channels to accommodate the tubing 33 and with valves 8. The tubing is provided as prefabricated branched sets 33.

FIG. 11 shows the 'Y's and 'T's of a chromatography system example as a process diagram with lines 34 showing positions for the valves.

FIG. 12 designates appropriate connected devices/elements to make a complete chromatography skid: Inlets A to D, Sample Inlet, To and From Pump, To and From Bubble Trap, To and From Filter, Column Top, Column Bottom, To and From Detector, To Fractions 1 to 4.

Figure 1:
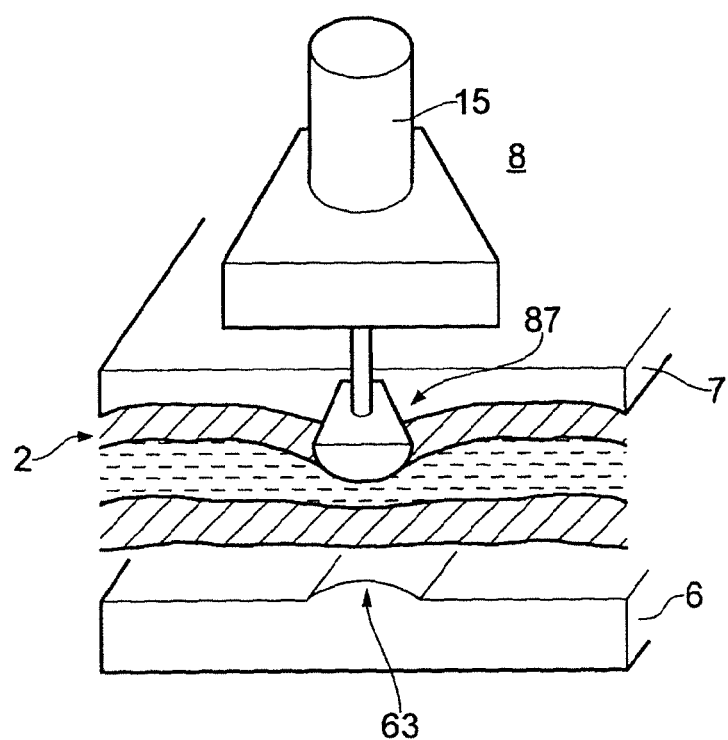
FIG. 1 is a schematic cross-section showing the action of a valve.

FIG. 1 shows schematically a bevel-shaped valve plunger 87 preferably made from stainless steel being moved up and down by an actuator 15 pressing on a tube 2 preferably made from platinum-cured silicone against a weir 63 thus constituting a valve.

Figure 2:
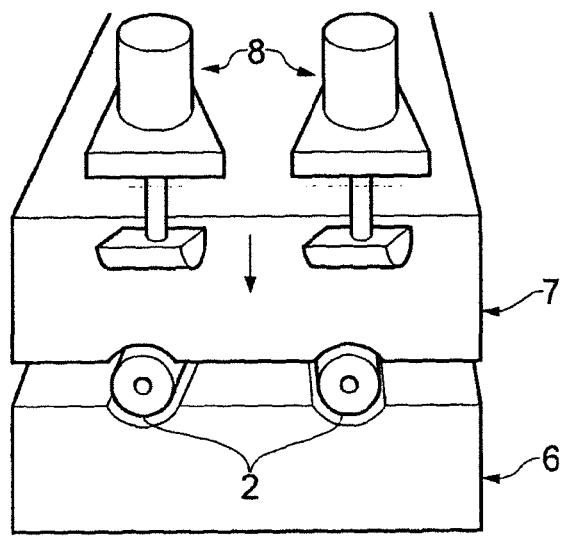
FIG. 2 is a similar schematic cross-section showing a pair of valves acting on adjacent tubing portions.

FIG. 2 is a 90° aspect of FIG. 1 where the tubes 2 can be seen from an axial view enclosed by the two support plates 6 and 7 meanwhile two actuators 8 are shown atop with the bevels approaching the tubes, this constituting a 'double' unit valve with two actuators.

FIG. 3 shows a notional alternative valving method whereby a latch 9 pulls down on the tube 10 by operating the manual clip 11 which could also be powered. This is a manually-driven, cam-secured valve action.

FIG. 4 shows a 'Y' junction tube 2 encased in the two halves 6,7 of the pressure envelope plates preferably made from acrylic for the front plate (transparent) and acetal for the back plate (strong for fitting the actuators onto). By joining many such units including single, T's, Y's, crosses etc. a whole process skid useful for chromatography, ultra-filtration or any process requiring plumbing can be created. The junction 4 has a polymeric encapsulation 5.

FIG. 5 is another view of a unit but the stem of the 'Y' encased in the plates 6,7 has the pressing device 15 onto the tubing 2 with wires 16 to power the presser.

FIG. 6 shows the tubing 2 sitting in the lower plate 6 without the top pressure envelope plate.

FIG. 7 shows a pressure holding plate 6 with the channels 220 ready for placement of a 'Y' piece of tubing.

FIG. 8 shows a typical termination 23, a triclamp, with tubing 2 preferably totally made from platinum-cured silicone.

FIG. 9 shows a termination cover 26 preferably made from polypropylene or similar strong moldable material which extends the pressure envelope outside the main two pressure holding plates over the termination 28 with a circumferential lug 25 which locates in a groove in the pressure holding plates thereby stopping the tubing extruding outside the pressure envelope when pressurised.
Cover 27 is in place on the tubing 2 whilst numeral 26 shows the same cover separated from the tubing.

FIG. 13 shows the FIG. 10 system on a stand 12 preferably made from stainless steel with back preferably made from acetal and front preferably made from acetal pressure-holding plates 6,7 and exit holes 38 for the terminations of the tubing matrices 33 inside.

FIG. 14 shows an example of how the tubing 33 would be installed and replaced anew whereby a bar 37 would be used with lever mechanism 122 to pull apart and together the two plates 6,7 with either bolts 39 or locating pins permanently in place with nuts as fasteners, either as shown, or on a hinged mechanism, in order to accurately locate the two pressure holding plates 6,7 together over the tubing manifolds 33 also to enable the operator to handle and locate the top plate 7 with ease. This has another benefit in having a smaller footprint than current systems available, such space being expensive in clean-rooms. Such a stand would make exchanging old tubing sets for new easier since this could be done without bending down. The benefit of such a system is that at the end of a process campaign the silicone pipework can be thrown away and a new, gamma-irradiated, sterile one put in its place between the two plates.

FIG. 15 is a schematic axial cross-section of a valve device embodying my proposals.

As before parts 6,7 indicate (fragmentarily) the rear and front plates of a support assembly as described previously. Preferably front plate 7 is transparent, e.g. of acrylic, and rear plate 6 is tough and opaque, e.g. of acetal. In FIG. 15 plates 6,7 are shown in section perpendicular to a support channel 61 containing flexible tubing 2, e.g. silicone tubing, and at the site of a valve device 8.

Preferably the site of the valve is at a position adjacent a tube junction, where the wall of the tubing 2 is thickened by a sealed encapsulation used to form the junctions: see FIGS. 11 and 16.

As described previously, the support channel for the tubing for the most part closely surrounds the tubing with a generally circular contour. However, at the valve site the tubing is reinforced by the encapsulation, so there is room for some clearance around the tubing between the plates 6,7 for operation of the valve components as described below, that is to say, without a risk of tube rupture under pressure.

The valve device 8 comprises an actuating module 15 housed in an actuator casing 83, whose front is fixed against the rear face of the rear plate 6 by a fixing plate 89 and suitable fasteners 101 for holding it on.

The actuator 15 is shown schematically: it may be either pneumatically-actuated or electromagnetically-actuated. It has a central stem 85 which projects forward and through the front of the housing.

The operating clearance or cavity between the plates 6,7 includes a slot-form cavity or operating clearance 72 in the rear face of the front plate 7. This runs laterally into the tubing support channel 61 and beneath the front of the valve actuating module.

A transverse presser bar 87 operates in this clearance, driven by the actuator. The bar is cylindrical in form, so as to localise force on the flexible tubing 2 but without damaging its surface. It occupies the slot-form operating cavity which keeps it perpendicular to the support channel 61. It is connected at one end to the stem 85 of the actuator which extends through an access hole 65 through the rear plate 6, just to one side of the support channel 61. The L-form stem and presser bar arrangement might be replaced with a U-form arrangement having a draw bar on both sides.

A preferred modification is that the presser bar can be removed or rotated after separating the plates 6,7 for tubing to be moved in or out of the channel 61.

In the illustrated embodiment the counter-surface 68 behind the tubing 2 is formed with a transverse ridge 63, opposing the pressure bar 87, to increase the closing pressure achieved for a given force applied and improve the seal, and/or to reduce the actuator force required for an adequate seal.

Actuator components may be made from any conventional materials e.g. steel or standard plastics such as polypropylene.

In FIG. 16, three limbs of tubing 41, 42, 43 meet at a junction 4 formed and contained within a one-piece moulded encapsulation 5. These are commercially available. The spots show the positions of the valve actuator axes. The respective presser bars 87 of these valves are arranged perpendicular to the respective flowpaths, as shown in broken lines.

Concerning tubing fit and channel shape, in an example we used a channel subtending about 200° and got good results using silicone tubing of ⅝" (16 mm) outer diameter, fitting snugly in it.

See FIG. 17, showing the back plate 6 and front plate 7, with the emergence opening of the superimposed back plate groove 61 and front plate groove 71 which combine to form a circular-section channel. The broken line across the opening indicates the plane of the interface. The back plate channel 61 subtends about 200°. The dashed line 'C' indicates the centre axis of the circular channel.

FIG. 20 shows a modified form of termination cover 26, or adapted ferrule. It has a front angled periphery 261 for engagement by a tri-clamp in a known fashion. A cup portion 262 behind it will contain an enlargement of the tube end, and a tubular rear extension 264 is substantially cylindrical. A square-form lug 263 is formed integrally, projecting radially outwardly around the ferrule.

FIGS. 18 and 19 are a top view (from the interface side) and an edge view of a support plate 6, with shaping of the emergence point of the channel 61 to locate a termination cover such as cover 26 seen in FIG. 20. Portion 614 illustrates the main channel diameter in which the silicone tubing will fit snugly. Diameter enlargement 612, extending a short distance in from the edge face, accommodates the rear tubular portion 264 of the termination cover. Part-way along this enlargement, a slot 613 of square shape (see FIG. 19) is machined into the plate, and accommodates half of the square-shaped flange 263 of the termination cover. Similar formations are provided on the opposed plate. The flared portion 262 of the termination cover projects out from the opening 611 of the channel, and the inwardly-directed shoulder 615 at the front of the square slots 613 interact with the square-shaped flange 263 to prevent escape of the termination cover once the support plates are clamped together.

FIG. 21 shows a second embodiment of termination cover 1262 in position, illustrating also an integral moulded enlargement 302 of the end of the tubing 301 within the termination cover. It features in this embodiment an annular front sealing projection 303. The figure also shows schematically the elements of a tri-clamp 1311, which engage with the sloping periphery 1261 of the termination cover in use in the usual way. A particular modification in this embodiment is the provision of a cushion or deformable load-spreading infill between the front of the locating flange 1263 and the opposed rear face of the slot shoulder.

Here the cushion is shown as an o-ring 1320 but it could take many forms. Its purpose is to distribute the applied force over the surfaces, so that minor non-uniformities or imperfections of shapes do not cause high local pressures that might damage the plates.

FIG. 22 shows a second embodiment of anti-twist cover, which can be colour-coded. It may be machined from one piece of bar stock. The retaining element has two side flats to be captured by the two plates, and rounded ends to assist location in a complementary recess in each plate.

FIG. 23 shows schematically an alternative flow set-up, here a non-pressurised system, in which liquid is fed from a bulk container L by pump P, desirably under sterile conditions, and distributed to each of individual customer containers C1 -C5 under the control of respective valves V1 -V5. The branched tubing set is formed from conventional e.g. silicone flexible non-reinforced tube, with polymer-encapsulated branch points. It is supported between a pair of support plates SP according to any one of the above proposals, and the valves V are external pressers as described above. In such a system invasiveness is minimal, the valves V can be remotely operated while operation can easily be observed and the tubing set T can simply be discarded after sufficient use.

The invention claimed is:

1. Fluid processing apparatus comprising a prefabricated flow network of tubular flow conduits of flexible elastic polymeric tubing, said network including plural branching points where three or more parts of the tubing meet, for conducting process fluid between processing elements of the apparatus, one or more flow control valves for controllably modifying the flow of fluid, and a tubing support body defining a pattern of support channels in which all or part of the prefabricated flow network of flexible tubing is received, the corresponding pattern of support channels in the tubing support body including branching points corresponding to those of the tubing network and the flexible tubes of the tubing network lying in the support channel so that the support channel limits or prevents expansion of the flexible tube material, the prefabricated flow network of flexible tubing having tubing terminations emerging from the support body, and the apparatus comprising termination covers encasing the tubing terminations to prevent their expansion, and engaging the support body mechanically to restrain the termination covers from outward movement relative to the support body, when under internal pressure.

2. Fluid processing apparatus of claim 1 in which the polymeric tubing is of outer diameter 5 to 30 mm.

3. Fluid processing apparatus of claim 1 in which the support body comprises opposed support body parts which define said channels between them and which can be separated to open the channels for insertion or removal of the flexible tubing, and closed together to enclose the flexible tubing closely in the channels.

4. Fluid processing apparatus of claim 3 in which a cavity forming each channel is defined partly by a groove in the face of one said opposed part of the support body and partly by a groove in the opposed face of the other.

5. Fluid processing apparatus of claim 3 in which said opposed parts are respectively front and rear plates, the front plate being transparent.

6. Fluid processing apparatus of claim 3 in which the separable opposed body parts of the support body are mounted in or on structure for controlling their movement relative to one another, and comprising guide mechanism engaging between the body parts to ensure that they come together in alignment.

7. Fluid processing apparatus of claim 1 in which the support body is of rigid plastics material.

8. Fluid processing apparatus of claim 1 in which the support body is provided on a fixed or mobile stand such as a skid, trolley or cabinet, or is mounted on a wall or ceiling, in correct alignment.

9. Fluid processing apparatus of claim 1 in which said one or more flow control mechanisms comprise one or more valves operable to press on the flexible tubing in a said support channel, compressing the tubing to block the flow.

10. Fluid processing apparatus of claim 9 in which the or each valve comprises a presser element housed or mounted in the support body, and movable relative to the support body across the support channel to a closed position in which it will compress a flexible tube in the channel to shut off flow, and an actuator to drive or control movement of the presser element across the support channel.

11. Fluid processing apparatus of claim 10 in which the valve presser element is formed as or with a rib or bar extending transversely over the support channel.

12. Fluid processing apparatus of claim 10 in which the valve actuator has an electrical, electromechanical, pneumatic, electromagnetic or manually-driven mechanism.

13. Fluid processing apparatus of claim 1 in which the termination covers are of plastic or metal.

14. Fluid processing apparatus of claim 1 in which different termination covers are differently colour or symbol coded.

15. Fluid processing apparatus of claim 1 in which the termination covers engage mechanically in the support body to prevent the termination covers from turning in the support body.

16. Fluid processing apparatus of claim 1 comprising, as one or more fluid processing elements connected to said flow network, any one or more of a pump, filter, bubble trap, mixing chamber, chromatography column, separation devices, heater, cooler, irradiation device, sensor, detector, flow gauge or flow meter.

17. Processing method in which process fluid is passed through fluid processing apparatus of claim 1 under raised pressure.

18. Processing method of claim 17 in which said process fluid passes through one or more fluid processing elements connected to said flow network of the apparatus, and comprising any one or more of a pump, filter, bubble trap, mixing chamber, chromatography column, separation devices, heater, cooler, irradiation device, sensor, detector, flow gauge or flow meter, and/or in which said process is a process of purification, capture, absorption, adsorption, desorption, partition, separation, filtration, ultrafiltration or chromatography.

19. Processing method of claim 17 comprising intermittently removing a said prefabricated flow network of tubular flow conduits of flexible tubing from said support body, and/or inserting a said prefabricated flow network of tubular flow conduits of flexible tubing in said support body.

20. A prefabricated flow network of tubular flow conduits of flexible elastic polymeric tubing of outer diameter 5 to 30 mm, said network including plural branching points where three or more parts of the tubing meet, the prefabricated flow network being for use in conducting process fluid between processing elements of fluid processing apparatus comprising a tubing support body defining a pattern of support channels in which all or part of the prefabricated flow network of flexible tubing is received, the corresponding pattern of support channels in the tubing support body including branching points corresponding to those of the tubing network and the flexible tubes of the tubing network lying in the support channel so that the support channel limits or prevents expansion of the flexible tube material, the prefabricated flow network of flexible tubing having tubing terminations which in use emerge from a said support body, and comprising tubular terminations covers encasing the respective tubing terminations to prevent their expansion, the termination covers comprising formations selected from lugs, flanges or other local projections to engage the support body in use to restrain the termination covers from outward movement and/or rotational movement relative to the support body.

21. Prefabricated flow network according to claim 20 in which each tubular termination cover has a rear portion to fit into an emergence-point recess of the support body and make said mechanical engagement, and a front portion to project outwardly from the support body and make a connection with another tubing component in use.

22. Prefabricated flow network according to claim 20 in which the flexible tubing ends at the tubing terminations of the prefabricated flow network are outwardly flared, and the corresponding termination covers have a cup part surrounding the outwardly flared tubing end.

* * * * *